No. 691,759. Patented Jan. 28, 1902.
J. R. GEORGE & V. E. EDWARDS.
COUPLING FOR ROLLING MILL SHAFTS.
(Application filed June 11, 1900.)
(No Model.)
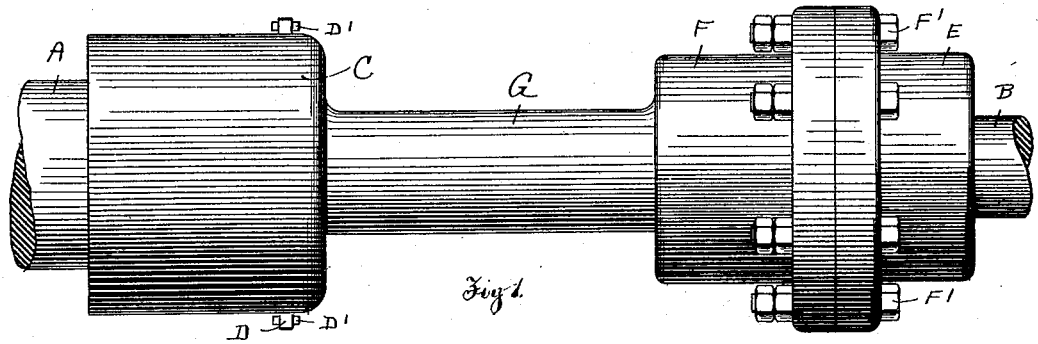
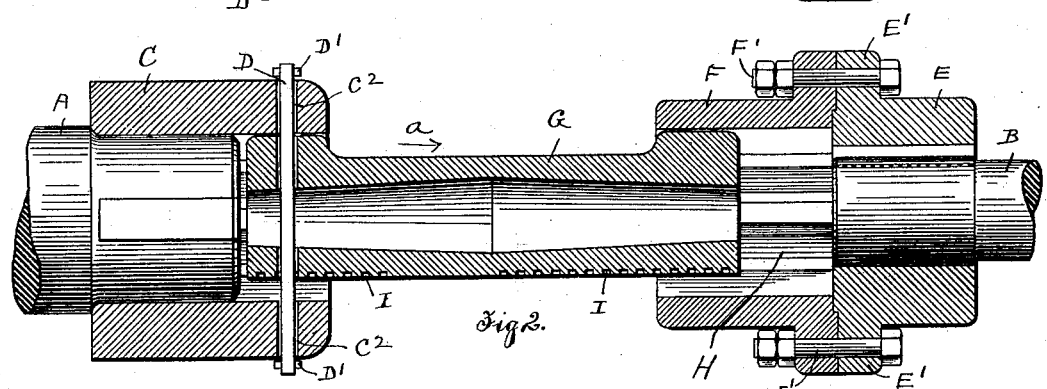
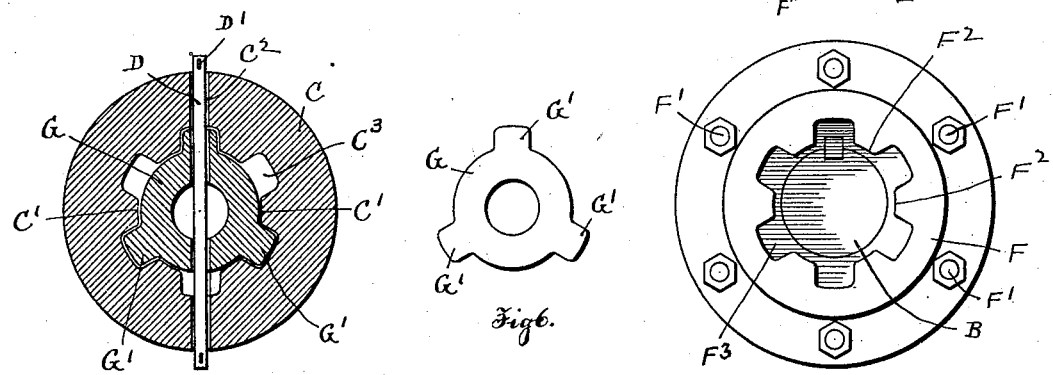
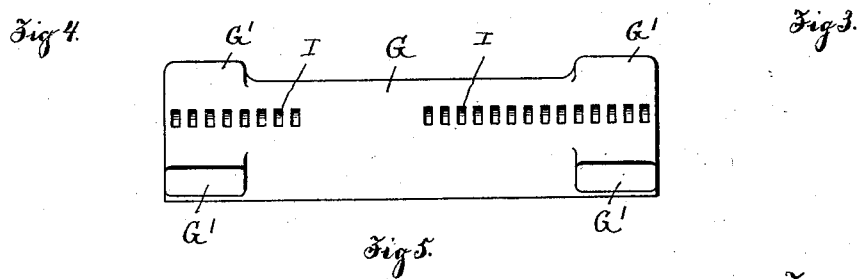
Witnesses:
Harry M. Rugg.
Ava P. Murphy.
Inventors
Victor E. Edwards,
Jerome R. George.
By Rufus B. Fowler, Atty.
THE NORRIS PETERS CO., PHOTO-LITHO., WASHINGTON, D. C.

UNITED STATES PATENT OFFICE.

JEROME R. GEORGE AND VICTOR E. EDWARDS, OF WORCESTER, MASSACHUSETTS, ASSIGNORS TO THE MORGAN CONSTRUCTION COMPANY, OF WORCESTER, MASSACHUSETTS, A CORPORATION OF MASSACHUSETTS.

COUPLING FOR ROLLING-MILL SHAFTS.

SPECIFICATION forming part of Letters Patent No. 691,759, dated January 28, 1902.

Application filed June 11, 1900. Serial No. 19,847. (No model.)

*To all whom it may concern:*

Be it known that we, JEROME R. GEORGE and VICTOR E. EDWARDS, citizens of the United States, and residents of Worcester, in the county of Worcester and Commonwealth of Massachusetts, have invented certain new and useful Improvements in Couplings for Rolling-Mill Shafts, of which the following is a specification, reference being had to the accompanying drawings, forming a part of the same, in which—

Figure 1 represents a front elevation of our improved coupling for rolling-mill shafts. Fig. 2 is a central vertical sectional view of the same. Fig. 3 is an end view of one of the internally-fluted collars which receive the fluted ends of the coupling-bar. Fig. 4 is a transverse sectional view on the plane of the pin D. Figs. 5 and 6 are detached and end views of the coupling-bar.

Similar reference-letters refer to similar parts in the different views.

Our invention relates to a device for coupling together the ends of shafts or roll-gudgeons of a rolling-mill, whereby a rotary motion of one shaft or gudgeon is imparted to another shaft or gudgeon in alinement therewith; and it consists in the construction and arrangement of parts, as hereinafter described, and set forth in the annexed claims.

Referring to the drawings, A denotes a driving-shaft, and B a driven shaft or roll-gudgeon having its axis in alinement with the driving-shaft A, the two shafts being connected by one of our improved couplings.

Keyed upon the end of the shaft A is a sleeve C, with its end overhanging the end of the shaft and having an interior fluted surface consisting of six equidistant ribs $C'$, lying parallel with the axis of the sleeve and having a transverse hole $C^2$ to receive a pin D, which is held loosely in the hole $C^2$ and held in place by cotter-pins $D'$.

To the end of the driven shaft or gudgeon B is keyed a sleeve having a flange $E'$, to which is bolted a flanged sleeve F by means of bolts $F''$. The sleeve F has an interior fluted surface consisting, preferably, of six equidistant teeth $F^2$. The sleeves C and F are operatively connected by a coupling-bar G, preferably hollow, and having at each of its ends three short equidistant longitudinal ribs or teeth $G'$, adapted to enter the sleeves C and F, with the three ribs $G'$ entering alternate spaces or grooves $C^3$ and $F^3$ between the teeth $C'$ and $F^2$, so that the rotary motion of the shaft A will be transmitted through the bar G to the shaft B. The connecting-bar G is held in place by the pin D, passing through holes $C^2$ in the sleeve C and corresponding holes in the coupling-bar. The coupling-bar G is inserted into the sleeves C and F a distance equal to the length of the teeth $G'$ upon the ends of the bar, and a space H is left between the end of the coupling-bar G and the end of the shaft B slightly greater than the distance the coupling-bar is inserted in the sleeve C, so that the two shafts may be disconnected by withdrawing the pin D and sliding the coupling-bar longitudinally in the direction of the arrow $a$, Fig. 2, by which the end of the coupling-bar is moved out of engagement with the sleeve C. The coupling-bar G is provided with a series of recesses I I, adapted to receive the end of a bar by which the coupling-bar G may be moved longitudinally into or out of engagement with the sleeve C by inserting the end of the bar into a recess in one of the sleeves and using the end of the sleeve as a fulcrum. The ribs $G'$ engage alternate grooves or spaces between the teeth of the sleeves, and whenever these spaces become worn with use the coupling-bar G can be turned to bring the ribs $G'$ into engagement with new and unworn grooves in the sleeves C and F.

By the employment of hollow sleeves projecting beyond and inclosing the ends of the coupling-bar instead of the coupling-sleeve now in common use we are able to use a longer coupling-bar with a given distance between the ends of the shafts, so that a variation in the alinement of the axes of the coupled shafts will cause less deflection of the coupling-bar. The space H provides room for an endwise thrust or movement of the shafts without injury to the coupling device and also permits an endwise movement of the coupling-bar in order to readily disengage the shafts. The sleeve F is detachable from the sleeve E, thereby allowing the coupling-bar to be easily removed. By making the grooves in the fluted sleeves a multiple of the ribs on the ends of the coupling-bar the lost motion occasioned by excessive wear of the engaging surfaces may be taken up by withdrawing the coupling-bar and inserting its ribs or teeth into new and unworn grooves in the sleeves.

We do not confine ourselves to the use of the pin D to hold the coupling-bar G from longitudinal movement, nor do we confine ourselves to the specific form or number of the ribs or teeth on the ends of the coupling-bar or within the sleeves C and F, except that it is desirable that the number of teeth in each of the sleeves C and F be a multiple of the number of teeth on the corresponding ends of the coupling-bar.

What we claim as our invention, and desire to secure by Letters Patent, is—

1. In a shaft-coupling, the combination with the opposing ends of the shafts, of sleeves attached to said shaft ends and provided with internal, longitudinal grooves and a coupling-bar provided at each of its ends with teeth, or ribs, adapted to engage the walls of said grooves, said bar being capable of longitudinal movement in one of said sleeves to allow its being withdrawn from the opposite sleeve and means for holding said coupling-bar from longitudinal movement in said sleeves, substantially as described.

2. In a shaft-coupling, the combination with shafts having opposing ends in alinement, of collars attached to said shaft ends and provided with internal, longitudinal grooves to receive the ribbed ends of a coupling-bar and a coupling-bar provided with ribs, or teeth, at its ends to engage the internally-grooved sleeves, the grooves in each of said sleeves being a multiple of the teeth, or ribs, on the corresponding ends of said coupling-bar, substantially as described.

3. The combination with a rotating shaft A, of a sleeve C attached to said shaft and overlapping its end and having longitudinal interior grooves, a shaft B, in alinement with said shaft A, a sleeve E attached to said shaft B and having a flange E', a flanged sleeve F detachably attached to the flange of said sleeve E and having longitudinal interior grooves, of a coupling-bar G provided at its opposite ends with ribs, or teeth, engaging the walls of said grooves in said sleeves C and F, substantially as described.

In testimony whereof we have signed our names to this specification, in presence of two subscribing witnesses, this the 1st day of June, 1900.

JEROME R. GEORGE.
VICTOR E. EDWARDS.

Witnesses:
ALLAN E. LOWE,
ERNEST W. DUSTON.